United States Patent

[11] 3,625,595

| [72] | Inventor | Andor A. Fleischman |
| --- | --- | --- |
| | | Northbrook, Ill. |
| [21] | Appl. No. | 5,487 |
| [22] | Filed | Jan. 26, 1970 |
| [45] | Patented | Dec. 7, 1971 |
| [73] | Assignee | Bell & Howell Company |
| | | Chicago, Ill. |

[54] SELF-COMPENSATING SYMMETRICAL LENS SYSTEM
4 Claims, 1 Drawing Fig.

[52] U.S. Cl.................................................. 350/215,
350/255, 355/55
[51] Int. Cl...................................................... G02b 7/04,
G02b 9/62
[50] Field of Search........................................... 350/215,
214, 220–222

[56] References Cited
UNITED STATES PATENTS

| 1,943,378 | 1/1934 | Elms............................ | 350/220 X |
| 2,746,349 | 5/1956 | Coleman..................... | 350/215 |
| 3,010,367 | 11/1961 | Miles........................... | 350/215 X |
| 3,088,371 | 5/1963 | Lowenthal................... | 350/215 X |

*Primary Examiner*—John K. Corbin
*Attorney*—Griffin, Branigan and Kindness

ABSTRACT: This disclosure describes a self-compensating lens system for use in a photocopier. The lens system is formed of six lens elements axially arrayed along a projection axis. The lenses are symmetrical about a center point. The four inner lenses are essentially fixed in space and the outer two lenses are axially moveable to provide compensation for mechanical and optical variations in the object-to-image distance of the photocopier.

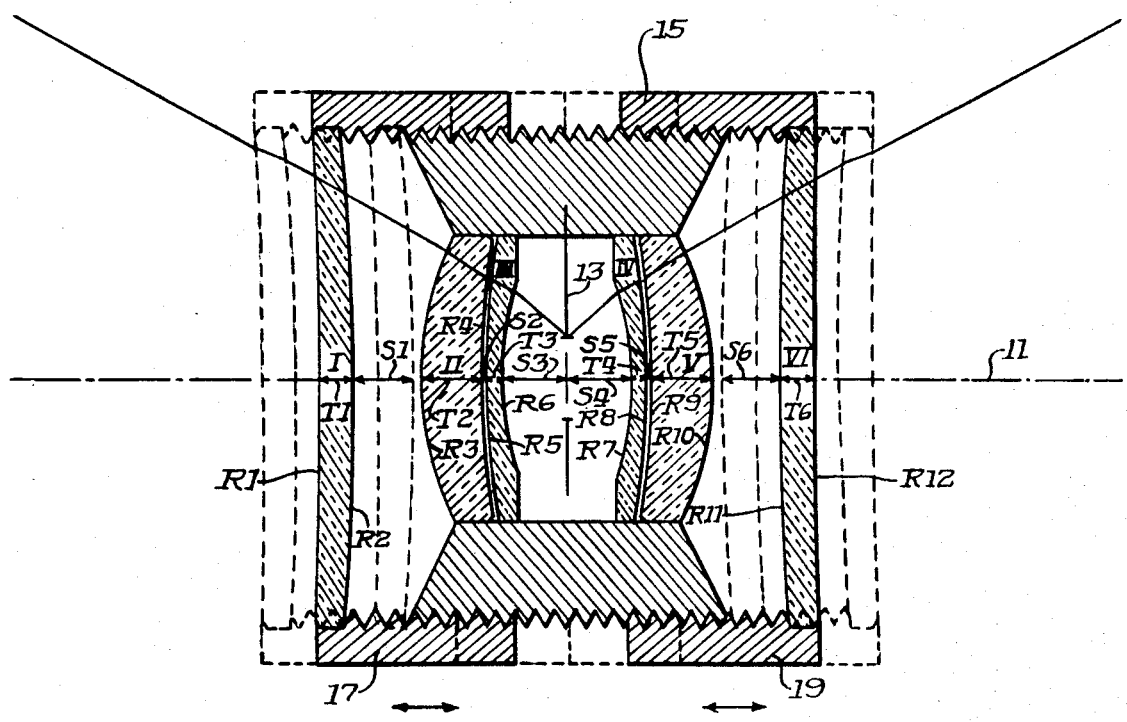

SELF-COMPENSATING SYMMETRICAL LENS SYSTEM

BACKGROUND OF THE INVENTION

This invention is related to an improved lens system which is particularly suitable for use in photocopying applications where the lenses are used at magnifications in the vicinity of unity.

Photocopying apparatus for transferring an image from an original document to a copy document utilizing optical principles is well known. While such systems have been widely used, they have certain disadvantages. For example, to create optically perfect copies, the manufacturing tolerances in the lenses (variations of indices, radii, thicknesses and air spaces) are very critical. In addition, the tolerances of the mechanical support components are critical. Hence, these systems are expensive to manufacture. And, even systems that closely adhere to the required tolerances do not always provide the desired perfectness of copies due to tolerance accumulation.

Various attempts have been made to solve the tolerance and tolerance accumulation problems in photocopiers. One such attempt is disclosed in U.S. Pat. 3,436,145 issued to E. W. Bechtold for "Focus Lens Pair Combined with Photocopying Objective." While systems such as that disclosed in the foregoing U.S. Pat. have aided in solving the problem, they have not been entirely satisfactory. For example, the system disclosed in the Bechtold patent has a very limited range of use, i.e., 0.125 inch. However, tolerance accumulations can vary over a greater range. In addition, the Bechtold system uses eight lenses, rather than a lesser number, thereby making it expensive to produce.

Therefore, it is an object of this invention to provide a novel optical system for use in a photocopier that compensates for both lens and mechanical variations.

It is a further object of this invention to provide a new and improved optical system having self compensation for lens tolerance variations.

It is another object of this invention to provide a new and improved optical system that has the ability to compensate for mechanical tolerances in the overall structure incorporating the optical system.

It is still another object of this invention to provide a new and improved compensating lens system suitable for use as the optical system of a photocopier having the ability to compensate for lens and mechanical tolerance variations.

It is a still further object of this invention to provide new and improved optical system which is particularly useful in photocopiers to compensate for the manufacturing tolerance accumulation of the various lens elements of the optical system.

It is yet another object of this invention to provide a new and improved compensating lens system suitable for use in a photocopier that is capable of compensating for manufacturing tolerance accumulation in the various mechanical elements of the lens system related to the object-to-image distance or total track of the photocopier.

SUMMARY OF THE INVENTION

In accordance with a principle of this invention, a self-compensating lens system particularly suitable for use in a photocopier is provided. The self-compensating lens system of the invention generally comprises six lenses that are symmetrically arrayed along a projection axis. The inner four lenses are generally fixed in space, while the outer two lenses are moveable along the projection axis.

In accordance with a further principle of the invention the overall magnification of the lenses is in the vicinity of unity.

In accordance with yet another principle of this invention, the two outer lenses can be wither convergent or divergent.

It will be appreciated from the foregoing brief description of the invention that a self-compensating lens system suitable for use in a photocopier (or, more generally, any optical system subject to accumulation tolerance error) is provided. Because only six lenses are required, the overall system is relatively inexpensive to manufacture. Further, because of its symmetrical design, the invention can compensate for relatively wide tolerance variations, over a range of 0.75 inch, for example. Hence, the stringent tolerance requirements of a photocopier utilizing the invention are somewhat reduced.

BRIEF DESCRIPTION OF THE DRAWING

The foregoing objects and many of the attendant advantages of this invention will become more readily appreciated as the same becomes better understood by reference to the following detailed description when taken in conjunction with the accompanying drawing which is a cross sectional view of a six element, essentially unity magnification lens system formed in accordance with the invention.

DESCRIPTION OF THE PREFERRED EMBODIMENT

The drawing illustrates the basic lens arrangement of the invention and comprises six lenses designated I, II, III, IV, V and VI. The lenses are arranged in the foregoing order from left-to-right along a projection axis 11. As will be better understood from the following description, lens I = lens VI; lens II = lens V; and lens III = lens IV. In addition, the separation of the lenses is such that the overall system is symmetrical about a vertical axis 13.

Lenses II, III, IV, and V are fixedly held in a lens barrel 15 in accordance with the spacings hereinafter described. Lens I is mounted in a lens cap 17 on the left side of the FIGURE and Lens VI is mounted in a lens cap 19 on the right side of the FIGURE. The lens caps 17 and 19 are threaded about the ends of the lens barrel 15. Hence, lens I and lens VI can be moved longitudinally along the projection axis 11. It will be appreciated that the movement means (i.e. threads) illustrated in the FIGURE is merely exemplary and that any other suitable means can be used.

Lenses I and VI may be either individually or simultaneously moved as desired. If a low cost, least complex system is desired, these lens elements can be individually moved. Whereas, if a higher cost, more complex system is desired, these lens elements can be coupled together and moved in a synchronized manner. However, while these two lens elements do not have to move in synchronism in order to maintain symmetry, they do have to move equal distances toward or away from one another as necessary to obtain focus. In other words, equal distance and direction movement, which may or may not be simultaneous, is necessary to the preferred operation of the invention.

In the following descriptions of actual embodiments of the invention: a minus (−) sign is given to all concave radii; R represents the radius of curvature; $N_D$ designates the index of refraction in Sodium D light; V designates the Abbe or dispersion number; EFL and F are interchangeable and represent the equivalent focal length of the system; FFL and BFL represent the front and back focal lengths, respectively; T represents the axial thickness of each lens; and, S represents the axial separation between lenses.

Optical systems formed in accordance with the invention may be constructed by the use of certain constructional data which are given in the following three mathematical tables, wherein: the first column designates the minimum value; the second column designates the particular component, ratio, thickness separation distance, index of refraction, dispersion number or focal length involved; and, the third column designates the maximum value.

TABLE 1

Element I and VI convergent

| Minimum value | | Maximum value |
|---|---|---|
| 2 | $R_1/R_2 = R_{12}/R_{11}$ | 3 |
| .32 | $R_3/R_4 = R_{10}/R_9$ | .42 |
| 2 | $R_5/R_6 = R_8/R_7$ | 3 |
| 15 | $R_1/R_3 = R_{12}/R_{10}$ | 25 |
| 7 | $R_1/R_5 = R_{12}/R_8$ | 10 |

TABLE 2

Element I and VI divergent

| Minimum value | | Maximum value |
|---|---|---|
| .4 | $R_1/R_2 = R_{12}/R_{11}$ | .9 |
| .1 | $R_3/R_4 = R_{10}/R_9$ | .4 |
| .2 | $R_5/R_6 = R_8/R_7$ | 3 |
| 4 | $R_1/R_3 = R_{12}/R_{10}$ | 7 |
| 2 | $R_1/R_5 = R_{12}/R_8$ | 4 |

TABLE 3

| Minimum value | | Maximum value |
|---|---|---|
| .01F | $T_1 = T_6$ | .03F |
| .02F | $T_2 = T_5$ | .05F |
| .002F | $T_3 = T_4$ | .02F |
| .001F | $S_1 = S_6$ | .1F |
| .0005F | $S_2 = S_5$ | .01F |
| .01F | $S_3 = S_4$ | .06F |
| $-.5F$ | $R_1 = R_{12}$ | $-5F$ |
| .5F | $R_2 = R_{11}$ | 2F |
| .1F | $R_3 = R_{10}$ | .3F |
| $-.3F$ | $R_4 = R_9$ | $-1.0F$ |
| .2F | $R_5 = R_8$ | .6F |
| $-.1F$ | $R_6 = R_7$ | $-.3F$ |
| 1.8F | $FF = BF$ | 2.2F |
| 1.523 | $N_D(I) = N_D(VI)$ | 1.620 |
| 1.650 | $N_D(II) = N_D(V)$ | 1.720 |
| 1.580 | $N_D(III) = N_D(IV)$ | 1.650 |
| 50.0 | $V(I) = V(VI)$ | 60.0 |
| 45.0 | $V(II) = V(V)$ | 55.0 |
| 30.0 | $V(III) = V(IV)$ | 40.0 |

EXAMPLE I

In specific embodiments of the invention, using convergent adjustable elements, optimized to cover a semi field angle of 30° at a relative aperture for infinity of $f/22$; the characteristics of the system have the following values:

TABLE 4

$R_1 = R_{12} = -3.89F$
$R_2 = R_{11} = 1.54F$
$R_3 = R_{10} = .178F$
$R_4 = R_9 = -.478F$
$R_5 = R_8 = .442F$
$R_6 = R_7 = -.164F$
$T_1 = T_6 = .017F$
$T_2 = T_5 = .029F$
$T_3 = T_4 = .008F$
$S_1 = S_6 = .035F$
$S_2 = S_5 = \pm.240''$
$S_3 = S_5 = .0007F$
$S_3 = S_4 = .03F$
$N_D(I) = N_D(VI) = 1.611$
$N_D(II) = N_D(V) = 1.670$
$N_D(III) = N_D(IV) = 1.617$
$V(I) = V(VI) = 58.8$
$V(II) = V(V) = 47.2$
$V(III) = V(IV) = 36.6$

More specifically, the characteristics of a specific embodiment may have the following values (in inches):

TABLE 5

| | Nominal track, inches | Long track, inches | Short track, inches |
|---|---|---|---|
| EFL | 6.985 | 7.077 | 7.896 |
| BFL (at 1:1 mag.) | 13.152 | 13.100 | 13.239 |
| FFL (at 1:1 mag.) | 13.152 | 13.100 | 13.239 |
| Total track (at 1:1 mag.) | 28.038 | 28.386 | 27.704 |

TABLE 6

| Element | Radius | Thickness | Air space | $N_D$ | V |
|---|---|---|---|---|---|
| I | $R_1 = -27.1739$ $R_2 = 10.7608$ | $T_1 = .120$ | | 1.611 | 58.8 |
| II | $R_3 = 1.245$ $R_4 = -3.337$ $R_5 = 3.103$ | $T_2 = .205$ | $S_1 = .250 \pm .240''$ $S_2 = .005$ | 1.670 | 47.2 |
| III | $R_6 = -1.145$ | $T_3 = .057$ | | 1.617 | 36.6 |
| | | | $S_3 = .216$ —Stop— $S_4 = .216$ | | |
| IV | $R_7 = -1.145$ $R_8 = 3.103$ | $T_4 = .057$ | | 1.617 | 36.6 |
| | | | $S_5 = .005$ | | |
| V | $R_9 = -3.337$ $R_{10} = 1.245$ | $T_5 = .205$ | | 1.670 | 47.2 |
| | | | $S_6 = .250 \pm .240''$ | | |
| VI | $R_{11} = 10.7608$ $R_{12} = -27.1739$ | $T_6 = .120$ | | 1.611 | 58.8 |

EXAMPLE II

In another embodiment of the invention, optimized to perform under similar requirements, however, utilizing divergent compensating element, the characteristics have the following values:

TABLE 7

$R_1 = R_{12} = -1.02F$
$R_2 = R_{11} = 1.60F$
$R_3 = R_{10} = .180F$
$R_4 = R_9 = -.834F$
$R_5 = R_8 = .325F$
$R_6 = R_7 = -.140F$
$T_1 = T_6 = .016F$
$T_2 = T_5 = .042F$
$T_3 = T_4 = .008F$
$S_1 = S_6 = .028F$
$S_1 = S_6 = \pm.190''$
$S_2 = S_5 = .0007F$
$S_3 = S_4 = .032F$
$N_D(I) = N_D(VI) = 1.617$
$N_D(II) = N_D(V) = 1.670$
$N_D(III) = N_D(IV) = 1.617$
$V(I) = V(VI) = 54.9$
$V(II) = V(V) = 47.2$
$V(III) = V(IV) = 36.6$

More specifically, the exact characteristics of a specific embodiment may have the following values (in inches):

TABLE 8

| | Nominal track, inches | Long track, inches | Short, track, inches |
|---|---|---|---|
| EFL | 6.950 | 7.048 | 6.854 |
| BFL (at 1:1 mag.) | 13.120 | 13.500 | 12.751 |
| FFL (at 1:1 mag.) | 13.120 | 13.500 | 12.751 |
| Total Track (at 1:1 mag.) | 28.010 | 28.389 | 27.653 |

TABLE 9

| Element | Radius | Thickness | Air space | $N_D$ | V |
|---|---|---|---|---|---|
| I | $R_1 = -7.115$ $R_2 = 11.110$ | $T_1 = .110$ | | 1.617 | 54.9 |
| | | | $S_1 = .200 \pm .190''$ | | |
| II | $R_3 = 1.261$ $R_4 = -5.801$ | $T_2 = .290$ | | 1.670 | 47.2 |
| | | | $S_2 = .005''$ | | |
| III | $R_5 = 2.263$ $R_6 = -.974$ | $T_3 = .055$ | | 1.617 | 36.6 |
| | | | $S_3 = .225$ —Stop— $S_4 = .225$ | | |
| IV | $R_7 = -.974$ $R_8 = 2.263$ | $T_4 = .055$ | | 1.617 | 36.6 |
| | | | $S_5 = .005''$ | | |
| V | $R_9 = -5.801$ $R_{10} = 1.261$ | $T_5 = .290$ | | 1.670 | 47.2 |
| | | | $S_6 = .200 \pm .190''$ | | |
| VI | $R_{11} = 11.110$ $R_{12} = -7.115$ | $T_6 = .110$ | | 1.617 | 54.9 |

Lens systems formed in accordance with the foregoing principles have exceptionally good characteristics in the wavelength range of 480–660 millimicrons. High quality zero vignetting and large semifield angle (approximately 30°) have been achieved with lens systems constructed so their parameters fall within in the foregoing ranges.

In use, the lens is mounted in photocopier in a well known manner between the original document and the copy paper and lenses I and VI are adjusted until the desired clarity of copy is achieved. If photocopier mechanical changes occur, these lenses can be easily adjusted by any suitable means to compensate for the changes.

The embodiments of the invention in which an exclusive property or privilege is claimed are defined as follows:

1. An essentially symmetrical optical system comprising six lens elements designated I, II, III, IV, V and VI in front to rear sequence symmetrically mounted along an optical axis so that lens elements II, III, IV and V are held in fixed spaced relation, the characteristics of the lens elements being such that lens element I = lens element VI, lens elements II = lens element V, and lens element III = lens element IV wherein the lens characteristics have the following values:

$$R_1 = R_{12} = -3.89E$$
$$R_2 = R_{11} = 1.54F$$
$$R_3 = R_{10} = .178F$$
$$R_4 = R_9 = -.478F$$
$$R_5 = R_8 = .442F$$
$$R_6 = R_7 = -.164F$$
$$T_1 = T_6 = .017F$$
$$T_2 = T_5 = .029F$$
$$T_3 = T_4 = .008F$$
$$S_1 = S_6 = .035F$$
$$S_2 = S_5 = \pm .240''$$
$$S_3 = S_4 = .0007F$$
$$S_3 = S_4 = .03F$$
$$N_D(I) = N_D(VI) = 1.611$$
$$N_D(II) = N_D(V) = 1.670$$
$$N_D(III) = N_D(IV) = 1.617$$
$$V(I) = V(VI) = 58.8$$
$$V(II) = V(V) = 47.2$$
$$V(III) = V(IV) = 36.6$$

wherein R represents the radius of curvature; $N_D$ represents the index of refraction in sodium D light; V designates the dispersion number; F represents the focal length of the overall 2. An essentially symmetrical optical system as claimed in claim 1 wherein the lens tracks have the following values in inches:

|  | Nominal track | Long track | Short track |
|---|---|---|---|
| EFL | 6.985 | 7.077 | 7.896 |
| BFL (at 1:1 mag.) | 13.152 | 13.100 | 13.239 |
| FFL (at 1:1 mag.) | 13.152 | 13.100 | 13.239 |
| Total track (at 1:1 mag.) | 28.038 | 28.386 | 27.704 | where EFL represents the equivalent focal length; BFL represents the back focal length; and, FFL represents the front focal length; and, the lens element curvatures, thicknesses and separations have the following values in inches:

| Element | Radius | Thickness | Air space |
|---|---|---|---|
| I | $R_1 = -27.1739$ | $T_1 = .120$ |  |
|  | $R_2 = 10.7608$ |  |  |
|  |  |  | $S_1 = .250 \pm .240''$ |
| II | $R_3 = 1.245$ | $T_2 = .205$ |  |
|  | $R_4 = -3.337$ |  |  |
|  |  |  | $S_2 = .005$ |
| III | $R_5 = 3.103$ | $T_3 = .057$ |  |
|  | $R_6 = -1.145$ |  |  |
|  |  |  | $S_3 = .216$ |
|  |  |  | —Stop— |
|  |  |  | $S_4 = .216$ |
| IV | $R_7 = -1.145$ | $T_4 = .057$ |  |
|  | $R_8 = 3.103$ |  |  |
|  |  |  | $S_5 = .005$ |
| V | $R_9 = -3.337$ | $T_5 = .205$ |  |
|  | $R_{10} = 1.245$ |  |  |
|  |  |  | $S_6 = .250 \pm .240''$ |
| VI | $R_{11} = 10.7608$ | $T_6 = .120$ |  |
|  | $R_{12} = -27.1739$ |  |  |

3. An essentially symmetrical optical system comprising six lens elements designated I, II, III, IV, V and VI in front to rear sequence symmetrically mounted along an optical axis so that lens elements II, III, IV, and V are held in fixed spaced relation, the characteristics of the lens elements being such that lens element I = lens element VI, lens element II = lens element V, and lens element III = lens element IV wherein the lens characteristics have the following values:

$$R_1 = R_{12} = -1.02F$$
$$R_2 = R_{11} = 1.60F$$
$$R_3 = R_{10} = .180F$$
$$R_4 = R_9 = -.834F$$
$$R_5 = R_8 = .325F$$
$$R_6 = R_7 = -.140F$$
$$T_1 = T_6 = .016F$$
$$T_2 = T_5 = .042F$$
$$T_3 = T_4 = .008F$$
$$S_1 = S_6 = .028F$$
$$S_1 = S_6 = \pm .190''$$
$$S_2 = S_5 = .0007F$$
$$S_3 = S_4 = .032F$$
$$N_D(I) = N_D(VI) = 1.617$$
$$N_D(II) = N_D(V) = 1.670$$
$$N_D(III) = N_D(IV) = 1.617$$
$$V(I) = V(VI) = 54.9$$
$$V(II) = V(VI) = 47.2$$
$$V(III) = V(IV) = 36.6$$

wherein R represents the radius of curvature: $N_D$ represents the index of refraction in sodium D light; V designates the dispersion number; F represents the focal length of the overall system; T represents the axial thickness of the lens; S represents the axial separation between the lenses; the R subscripts represent the lens faces going from front to back; the T subscripts represent the lens thickness going from front to back; the S subscripts represent the lens spacings going from front to back; and, the Roman numerals in parenthesis represent the six particular lens elements.

4. An essentially symmetrical optical system as claimed in claim 1 wherein the lens tracks have the following values in inches:

|  | Nominal track | Long track | Short track |
|---|---|---|---|
| EFL | 6.950 | 7.048 | 6.854 |
| BFL (at 1:1 mag.) | 13.120 | 13.500 | 12.751 |
| FFL (at 1:1 mag.) | 13.120 | 13.500 | 12.751 |
| Total track (at 1:1 mag.) | 28.010 | 28.389 | 27.653 | where EFL represents the equivalent focal length; BFL represents the back focal length; and, FFL represents the front focal length; and, the lens element curvatures, thicknesses, and separations have the following values in inches:

| Element | Radius | Thickness | Air space |
|---|---|---|---|
| I | $R_1 = -7.115$ | $T_1 = .110$ |  |
|  | $R_2 = 11.110$ |  |  |
|  |  |  | $S_1 = .200 \pm .190''$ |
| II | $R_3 = 1.261$ | $T_2 = .290$ |  |
|  | $R_4 = 5.801$ |  |  |
|  |  |  | $S_2 = .005$ |
| III | $R_5 = 2.263$ | $T_3 = .055$ |  |
|  | $R_6 = -.974$ |  |  |
|  |  |  | $S_3 = .225$ |
|  |  |  | —stop— |
|  |  |  | $S_4 = .225$ |
| IV | $R_7 = -.974$ | $T_4 = .055$ |  |
|  | $R_8 = 2.263$ |  |  |
|  |  |  | $S_5 = .005$ |
| V | $R_9 = -5.801$ | $T_5 = .290$ |  |
|  | $R_{10} = 1.261$ |  |  |
|  |  |  | $S_6 = .200 \pm .190''$ |
| VI | $R_{11} = 11.110$ | $T_6 = .110$ |  |
|  | $R_{12} = -7.115$ |  |  |

UNITED STATES PATENT OFFICE
CERTIFICATE OF CORRECTION

Patent No. 3,625,595          Dated December 7, 1971

Inventor(s) Andor A. Fleischman

It is certified that error appears in the above-identified patent and that said Letters Patent are hereby corrected as shown below:

Example I, Table 4 should appear as shown below:

$R_1 = R_{12} = -3.89F$ $R_2 = R_{11} = 1.54F$ $R_3 = R_{10} = .178F$ $R_4 = R_9 = -.478F$ $R_5 = R_8 = .442F$ $R_6 = R_7 = -.164F$ $T_1 = T_6 = .017F$ $T_2 = T_5 = .029F$ $T_3 = T_4 = .008F$ $S_1 = S_6 = .035F$ $S_1 = S_6 = \pm.240"$ $S_2 = S_5 = .0007F$ $S_3 = S_4 = .03F$ $N_D(I) = N_D(VI) = 1.611$ $N_D(II) = N_D(V) = 1.670$ $N_D(III) = N_D(IV) = 1.617$ $V(I) = V(VI) = 58.8$ $V(II) = V(V) = 47.2$ $V(III) = V(IV) = 36.6$

UNITED STATES PATENT OFFICE
CERTIFICATE OF CORRECTION

Patent No. 3,625,595     Dated December 7, 1971

Inventor(s) Andor A. Fleischman

It is certified that error appears in the above-identified patent and that said Letters Patent are hereby corrected as shown below:

In the claims, Claim 1 should read as follows:     -2-

Claim 1. An essentially symmetrical optical system comprising six lens elements designated I, II, III, IV, V and VI in front to rear sequence symmetrically mounted along an optical axis so that lens elements II, III, IV and V are held in fixed spaced relation, the characteristics of the lens elements being such that lens element I= lens element VI, lens element II= lens element V, and lens element III= lens element IV wherein the lens characteristics have the following values:

$$R_1 = R_{12} = -3.89F$$

$$R_2 = R_{11} = 1.54F$$

$$R_3 = R_{10} = .178F$$

$$R_4 = R_9 = -.478F$$

$$R_5 = R_8 = .442F$$

$$R_6 = R_7 = -.164F$$

UNITED STATES PATENT OFFICE
CERTIFICATE OF CORRECTION

Patent No. 3,625,595            Dated December 7, 1971

Inventor(s) Andor A. Fleischman

It is certified that error appears in the above-identified patent and that said Letters Patent are hereby corrected as shown below:

Claim 1 cont'd.    -3-

$$T_1 = T_6 = .017F$$

$$T_2 = T_5 = .029F$$

$$T_3 = T_4 = .008F$$

$$S_1 = S_6 = .035F$$

$$S_1 = S_6 = \pm.240"$$

$$S_2 = S_5 = .0007F$$

$$S_3 = S_4 = .03F$$

$$N_D(I) = N_D(VI) = 1.611$$

$$N_D(II) = N_D(V) = 1.670$$

UNITED STATES PATENT OFFICE
CERTIFICATE OF CORRECTION

Patent No. 3,625,595      Dated December 7, 1971

Inventor(s) Andor A. Fleischman

It is certified that error appears in the above-identified patent and that said Letters Patent are hereby corrected as shown below:

Claim 1 cont'd.

$$\frac{N(III)}{D} = \frac{N(IV)}{D} = 1.617$$

$$V(I) = V(VI) = 58.8$$

$$V(II) = V(V) = 47.2$$

$$V(III) = V(IV) = 36.6$$

Wherein R represents the radius of curvature; $N_D$ represents the index of refraction in sodium D light; V designates the dispersion number; F represents the focal length of the overall system; T represents the axial thickness of the lens; S represents the axial separation between the lenses; the R subscripts represent the lens faces going from front to back; the T subscripts represent the lens thickness going from front to back; the S subscripts represent the lens spacings going from front to back; and, the roman numerals in parenthesis represent the six particular lens elements.

Signed and sealed this 4th day of July 1972.

(SEAL)
Attest:

EDWARD M. FLETCHER, JR.      ROBERT GOTTSCHALK
Attesting Officer            Commissioner of Patents